(12) United States Patent
Preisler et al.

(10) Patent No.: US 9,567,037 B2
(45) Date of Patent: Feb. 14, 2017

(54) DEEP-DRAWN MARINE HULL HAVING A SANDWICH STRUCTURE WITH A CELLULOSE-BASED CORE AND WATERCRAFT UTILIZING SAME

(71) Applicant: GLOBAL IP HOLDINGS, LLC, Sterling Heights, MI (US)

(72) Inventors: Darius J. Preisler, Macomb, MI (US); Christopher A. Heikkila, Washington Township, MI (US)

(73) Assignee: GLOBAL IP HOLDINGS, LLC, Sterling Heights, MI (US)

( * ) Notice: Subject to any disclaimer, the term of this patent is extended or adjusted under 35 U.S.C. 154(b) by 44 days.

(21) Appl. No.: 14/603,418

(22) Filed: Jan. 23, 2015

(65) Prior Publication Data

US 2015/0136013 A1    May 21, 2015

Related U.S. Application Data

(63) Continuation-in-part of application No. 13/762,879, filed on Feb. 8, 2013, which is a continuation-in-part of application No. 13/479,974, filed on May 24, 2012.

(51) Int. Cl.
*B63B 5/24* (2006.01)
*B63B 35/71* (2006.01)
(Continued)

(52) U.S. Cl.
CPC . *B63B 5/24* (2013.01); *B63B 9/06* (2013.01); *B63B 17/00* (2013.01); *B63B 35/71* (2013.01);
(Continued)

(58) Field of Classification Search
CPC .............. B63B 5/24; B63B 17/00; B63B 9/06; B63B 35/71; B63B 3/20; B63B 2221/00; B63B 2005/242; B63B 2005/245; B63B 2005/247;B63B 43/18; F16B 5/01; F16B 37/067
See application file for complete search history.

(56) References Cited

U.S. PATENT DOCUMENTS 2,926,363 A * 3/1960 Madlem .................... B63B 3/00
114/347
3,568,254 A    3/1971 Stolki
(Continued)

FOREIGN PATENT DOCUMENTS

CA    2002568 A * 5/1990
JP    60227596 A * 11/1985
JP    04005033 A * 1/1992

OTHER PUBLICATIONS

Office Action; related U.S. Appl. No. 14/087,563; notification date Jul. 20, 2015.
(Continued)

*Primary Examiner* — Ajay Vasudeva
(74) *Attorney, Agent, or Firm* — Brooks Kushman P.C.

(57) ABSTRACT

A deep-drawn, marine hull having a sandwich structure with a cellulose-based core and watercraft utilizing same are provided. The hull includes an outer skin of a fiber-based thermoplastic and having a waterproof outer surface, a first sheet of thermoplastic adhesive, an inner skin of a fiber-reinforced thermoplastic material and having a compartment-defining outer surface, a second sheet of thermoplastic adhesive and a shock absorbing, cellular core of a cellulose-based material and positioned between the skins The skins are bonded to the core by the first and second sheets and by press molding. Cells of the cellular core absorb energy of an impact at the outer surface of the outer skin by deformably crushing. Air trapped within cells which are not completely crushed or punctured by the impact provide the hull with buoyancy to allow the hull to float at the surface of a body of water.

18 Claims, 9 Drawing Sheets

(51) Int. Cl.
B63B 9/06 (2006.01)
B63B 17/00 (2006.01)
*B63B 3/20* (2006.01)
*B63B 43/18* (2006.01)
*F16B 5/01* (2006.01)
*F16B 37/06* (2006.01)

(52) U.S. Cl.
CPC .................. *B63B 3/20* (2013.01); *B63B 43/18* (2013.01); *B63B 2221/00* (2013.01); *F16B 5/01* (2013.01); *F16B 37/067* (2013.01)

(56) References Cited

U.S. PATENT DOCUMENTS

| | | |
|---|---|---|
| 3,651,563 A | 3/1972 | Volkmann |
| 3,750,525 A | 8/1973 | Waters et al. |
| 3,955,266 A | 5/1976 | Honami et al. |
| 4,148,775 A * | 4/1979 | Shima .................... C08G 61/02 524/169 |
| 4,175,995 A | 11/1979 | Walter |
| 4,204,822 A | 5/1980 | Hewitt |
| 4,550,854 A | 11/1985 | Schellenberg |
| 4,717,612 A | 1/1988 | Shackelford |
| 4,836,380 A | 6/1989 | Walter et al. |
| 4,941,785 A * | 7/1990 | Witten .................... B29C 65/42 411/178 |
| 5,026,445 A | 6/1991 | Mainolfi et al. |
| 5,074,726 A | 12/1991 | Betchel et al. |
| 5,143,778 A | 9/1992 | Shuert |
| 5,198,175 A | 3/1993 | Kato et al. |
| 5,217,563 A | 6/1993 | Niebling et al. |
| 5,253,962 A | 10/1993 | Close, Jr. |
| 5,298,694 A | 3/1994 | Thompson et al. |
| 5,316,604 A | 5/1994 | Fell |
| 5,370,521 A | 12/1994 | McDougall |
| 5,417,179 A | 5/1995 | Niemier et al. |
| 5,423,933 A | 6/1995 | Horian |
| 5,474,008 A * | 12/1995 | Vespoli .................... B63B 1/04 114/347 |
| 5,502,930 A | 4/1996 | Burkette et al. |
| 5,534,097 A | 7/1996 | Fasano et al. |
| 5,683,782 A | 11/1997 | Duchene |
| 5,700,050 A | 12/1997 | Gonas |
| 5,744,210 A | 4/1998 | Hofmann et al. |
| 5,750,160 A | 5/1998 | Weber et al. |
| 5,911,360 A | 6/1999 | Schellenberg |
| 5,915,445 A | 6/1999 | Rauenbusch |
| 5,928,735 A | 7/1999 | Padmanabhan et al. |
| 5,979,962 A | 11/1999 | Balentin et al. |
| 6,050,630 A | 4/2000 | Hochet |
| 6,066,217 A | 5/2000 | Dibble et al. |
| 6,102,464 A | 8/2000 | Schneider et al. |
| 6,102,630 A | 8/2000 | Flolo |
| 6,280,551 B1 | 8/2001 | Hilligoss |
| 6,435,577 B1 | 8/2002 | Renault |
| 6,537,413 B1 | 3/2003 | Hochet et al. |
| 6,546,694 B2 | 4/2003 | Clifford |
| 6,615,762 B1 | 9/2003 | Scott |
| 6,631,785 B2 | 10/2003 | Khambete et al. |
| 6,655,299 B2 | 12/2003 | Preisler et al. |
| 6,659,223 B2 | 12/2003 | Allison et al. |
| 6,682,675 B1 | 1/2004 | Vandangeot et al. |
| 6,682,676 B1 | 1/2004 | Renault et al. |
| 6,748,876 B2 | 6/2004 | Preisler et al. |
| 6,752,443 B1 | 6/2004 | Thompson et al. |
| 6,790,026 B2 | 9/2004 | Vandangeot et al. |
| 6,793,747 B2 | 9/2004 | North et al. |
| 6,823,803 B2 | 11/2004 | Preisler |
| 6,825,803 B2 | 11/2004 | Wixforth et al. |
| 6,843,525 B2 | 1/2005 | Preisler |
| 6,890,023 B2 | 5/2005 | Preisler et al. |
| 6,905,155 B1 | 6/2005 | Presley et al. |
| 6,926,348 B2 | 8/2005 | Krueger et al. |
| 6,945,594 B1 | 9/2005 | Bejin et al. |
| 6,981,863 B2 | 1/2006 | Renault et al. |
| 7,014,259 B2 | 3/2006 | Heholt |
| 7,059,646 B1 | 6/2006 | DeLong et al. |
| 7,059,815 B2 | 6/2006 | Ando et al. |
| 7,090,274 B1 | 8/2006 | Khan et al. |
| 7,093,879 B2 | 8/2006 | Putt et al. |
| 7,121,128 B2 | 10/2006 | Kato et al. |
| 7,121,601 B2 | 10/2006 | Mulvihill et al. |
| 7,188,881 B1 | 3/2007 | Sturt et al. |
| 7,204,056 B2 | 4/2007 | Sieverding |
| 7,207,616 B2 | 4/2007 | Sturt |
| 7,222,915 B2 | 5/2007 | Philippot et al. |
| 7,264,685 B2 | 9/2007 | Katz et al. |
| 7,320,739 B2 | 1/2008 | Thompson, Jr. et al. |
| 7,393,036 B2 | 7/2008 | Bastian et al. |
| 7,402,537 B1 | 7/2008 | Lenda et al. |
| 7,419,713 B2 | 9/2008 | Wilkens et al. |
| 7,530,322 B2 | 5/2009 | Angelini |
| 7,628,440 B2 | 12/2009 | Berhardsson et al. |
| 7,713,011 B2 | 5/2010 | Orszagh et al. |
| 7,837,009 B2 | 11/2010 | Gross et al. |
| 7,854,211 B2 | 12/2010 | Rixford |
| 7,909,379 B2 | 3/2011 | Winget et al. |
| 7,918,313 B2 | 4/2011 | Gross et al. |
| 7,919,031 B2 | 4/2011 | Winget et al. |
| 7,942,475 B2 | 5/2011 | Murray |
| 7,963,243 B2 | 6/2011 | Quigley |
| 8,052,237 B2 | 11/2011 | Althammer et al. |
| 8,062,762 B2 | 11/2011 | Stalter |
| 8,069,809 B2 | 12/2011 | Wagenknecht et al. |
| 8,117,972 B2 | 2/2012 | Winget et al. |
| 8,133,419 B2 | 3/2012 | Burks et al. |
| 8,262,968 B2 | 9/2012 | Smith et al. |
| 8,298,675 B2 | 10/2012 | Allessandro et al. |
| 8,316,788 B2 | 11/2012 | Willis |
| 8,475,884 B2 | 7/2013 | Kia |
| 8,622,456 B2 | 1/2014 | Preisler et al. |
| 8,651,549 B2 | 2/2014 | Raffel et al. |
| 8,690,233 B2 | 4/2014 | Preisler et al. |
| 8,764,089 B2 | 7/2014 | Preisler et al. |
| 8,795,465 B2 | 8/2014 | Preisler et al. |
| 8,795,807 B2 | 8/2014 | Preisler et al. |
| 8,808,827 B2 | 8/2014 | Preisler et al. |
| 8,808,828 B2 | 8/2014 | Preisler et al. |
| 8,808,829 B2 | 8/2014 | Preisler et al. |
| 8,808,830 B2 | 8/2014 | Preisler et al. |
| 8,808,831 B2 | 8/2014 | Preisler et al. |
| 8,808,833 B2 | 8/2014 | Preisler et al. |
| 8,808,834 B2 | 8/2014 | Preisler et al. |
| 8,808,835 B2 | 8/2014 | Preisler et al. |
| 8,834,985 B2 | 9/2014 | Preisler et al. |
| 8,852,711 B2 | 10/2014 | Preisler et al. |
| 8,859,074 B2 | 10/2014 | Preisler et al. |
| 8,883,285 B2 | 11/2014 | Preisler et al. |
| 9,302,315 B2 | 4/2016 | Verbeek et al. |
| 9,364,975 B2 | 6/2016 | Preisler et al. |
| 2004/0078929 A1 | 4/2004 | Schoemann |
| 2005/0189674 A1 | 9/2005 | Hochet et al. |
| 2006/0008609 A1 | 1/2006 | Snyder et al. |
| 2006/0121244 A1 | 6/2006 | Godwin et al. |
| 2006/0255611 A1 | 11/2006 | Smith et al. |
| 2007/0065264 A1 | 3/2007 | Sturt et al. |
| 2007/0069542 A1 | 3/2007 | Steiger et al. |
| 2007/0256379 A1 | 11/2007 | Edwards |
| 2007/0258786 A1 | 11/2007 | Orszagh et al. |
| 2008/0105866 A1 | 5/2008 | Jeong et al. |
| 2008/0185866 A1 | 5/2008 | Jeong et al. |
| 2008/0169678 A1 | 7/2008 | Ishida et al. |
| 2008/0193256 A1 | 8/2008 | Neri |
| 2009/0108639 A1 | 4/2009 | Sturt et al. |
| 2010/0026031 A1 | 2/2010 | Jouraku |
| 2010/0086728 A1 | 4/2010 | Theurl et al. |
| 2010/0170746 A1 | 7/2010 | Restuccia et al. |
| 2010/0206467 A1 | 8/2010 | Durand et al. |
| 2011/0260359 A1 | 10/2011 | Durand et al. |
| 2011/0315310 A1 | 12/2011 | Trevisan et al. |
| 2012/0247654 A1 | 10/2012 | Piccin et al. |
| 2012/0315429 A1 | 12/2012 | Stamp et al. |
| 2013/0031752 A1 | 2/2013 | Davies |

(56) References Cited

U.S. PATENT DOCUMENTS

| | | |
|---|---|---|
| 2013/0075955 A1 | 3/2013 | Piccin et al. |
| 2013/0137798 A1 | 5/2013 | Piccin |
| 2013/0278002 A1 | 10/2013 | Preisler et al. |
| 2013/0278003 A1 | 10/2013 | Preisler et al. |
| 2013/0278007 A1 | 10/2013 | Preisler et al. |
| 2013/0278008 A1 | 10/2013 | Preisler et al. |
| 2013/0278009 A1 | 10/2013 | Preisler et al. |
| 2013/0278015 A1 | 10/2013 | Preisler et al. |
| 2013/0278018 A1 | 10/2013 | Preisler et al. |
| 2013/0278019 A1 | 10/2013 | Preisler et al. |
| 2013/0278020 A1 | 10/2013 | Preisler et al. |
| 2013/0280459 A1 | 10/2013 | Nakashima et al. |
| 2013/0280469 A1 | 10/2013 | Preisler et al. |
| 2013/0280472 A1 | 10/2013 | Preisler et al. |
| 2013/0312652 A1 | 11/2013 | Preisler et al. |
| 2013/0316123 A1 | 11/2013 | Preisler et al. |
| 2013/0333837 A1 | 12/2013 | Preisler et al. |
| 2013/0341971 A1 | 12/2013 | Masini et al. |
| 2014/0077518 A1 | 3/2014 | Preisler et al. |
| 2014/0077530 A1 | 3/2014 | Preisler et al. |
| 2014/0077531 A1 | 3/2014 | Preisler et al. |
| 2014/0154461 A1 | 6/2014 | Preisler et al. |
| 2014/0225296 A1 | 8/2014 | Preisler et al. |
| 2014/0335303 A1 | 11/2014 | Preisler et al. |
| 2015/0130105 A1 | 5/2015 | Preisler et al. |
| 2015/0130220 A1 | 5/2015 | Preisler et al. |
| 2015/0130221 A1 | 5/2015 | Preisler et al. |
| 2015/0130222 A1 | 5/2015 | Preisler et al. |
| 2015/0132532 A1 | 5/2015 | Preisler et al. |
| 2016/0059446 A1 | 3/2016 | Lofgren |

OTHER PUBLICATIONS

Office Action; related U.S. Appl. No. 13/762,879; notification date Jul. 31, 2015.
Notice of Allowance and Fee(s) Due; related U.S. Appl. No. 14/087,579; date mailed Aug. 3, 2015.
Office Action; Related U.S. Appl. No. 13/479,974; Date of mailing Oct. 15, 2014.
Office Action; related U.S. Appl. No. 13/479,974; date of mailing Mar. 20, 2014.
Office Action; related U.S. Appl. No. 13/686,362; date of mailing Mar. 25, 2014.
Office Action; related U.S. Appl. No. 13/523,253; date of mailing Mar. 25, 2014.
Office Action; related U.S. Appl. No. 13/688,972; date of mailing Mar. 28, 2014.
Office Action; related U.S. Appl. No. 13/687,232; date of mailing Mar. 28, 2014.
Office Action; related U.S. Appl. No. 13/689,809; date of mailing Mar. 31, 2014.
Office Action; related U.S. Appl. No. 13/687,213; date of mailing Mar. 31, 2014.
Office Action; related U.S. Appl. No. 13/690,265; date of mailing Mar. 31, 2014.
Office Action; related U.S. Appl. No. 13/762,904; date of mailing Apr. 8, 2014.
Office Action; related U.S. Appl. No. 13/762,800; date of mailing Apr. 8, 2014.
Office Action; related U.S. Appl. No. 13/762,861; date of mailing Apr. 9, 2014.
Office Action; related U.S. Appl. No. 13/690,566; date of mailing Apr. 9, 2014.
Office Action; related U.S. Appl. No. 13/762,832; date of mailing Apr. 11, 2014.
Office Action; related U.S. Appl. No. 13/762,921; date of mailing Apr. 14, 2014.
Notice of Allowance; related U.S. Appl. No. 13/686,388; date of mailing Apr. 15, 2014.
Related U.S. Appl. No. 13/690,566, filed Nov. 30, 2012.
Related U.S. Appl. No. 13/762,921, filed Feb. 8, 2013.
Related U.S. Appl. No. 13/762,956, filed Feb. 8, 2013.
Office Action; related U.S. Appl. No. 13/453,201 (now U.S. Pat. No. 8,690,233); date of mailing Nov. 20, 2013.
Office Action; related U.S. Appl. No. 13/523,209 (now U.S. Pat. No. 8,622,456) date of mailing Apr. 29, 2013.
Non-Final Office Action, related U.S. Appl. No. 13/762,879; dated Feb. 13, 2015.
Non-Final Office Action, related U.S. Appl. No. 13/479,974; dated Feb. 13, 2015.
Notice of Allowance and Fee(s) Due; related U.S. Appl. No. 13/603,552; dated Feb. 18, 2015.
Notice of Allowance and Fee(s) Due; related U.S. Appl. No. 14/087,563; date of mailing Mar. 3, 2016.
Notice of Allowance and Fee(s) Due; related U.S. Appl. No. 14/087,591; date mailed Mar. 12, 2015.
Office Action; U.S. Appl. No. 13/762,956; notification date Apr. 17, 2015.
Office Action; U.S. Appl. No. 14/603,413; notification date Apr. 23, 2015.
Notice of Allowance and Fee(s) Due; related U.S. Appl. No. 14/603,403; date mailed Jan. 29, 2016.
Corrected Notice of Allowability; related U.S. Appl. No. 14/603,401; dated Jun. 23, 2016.
Notice of Allowance and Fee(s) Due; related U.S. Appl. No. 14/444,164; dated Jul. 15, 2016.
Office Action; related U.S. Appl. No. 14/603,397; dated Jul. 21, 2016.
Office Action; related U.S. Appl. No. 14/603,430; notification date Sep. 14, 2016.
Office Action; related U.S. Appl. No. 14/603,404; notification date Aug. 25, 2016.
Notice of Allowance and Fee(s) Due; related U.S. Appl. No. 14/603,397; date mailed Oct. 17, 2016.
Office Action; related U.S. Appl. No. 14/603,407; notification date Oct. 4, 2016.

\* cited by examiner

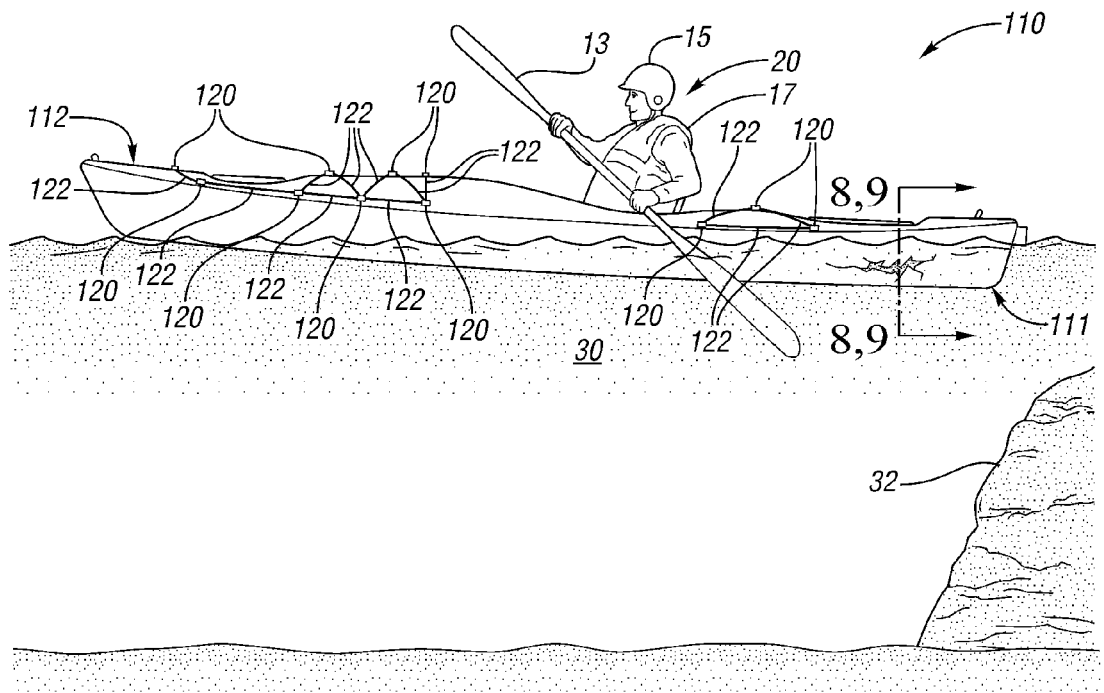
FIG. 5
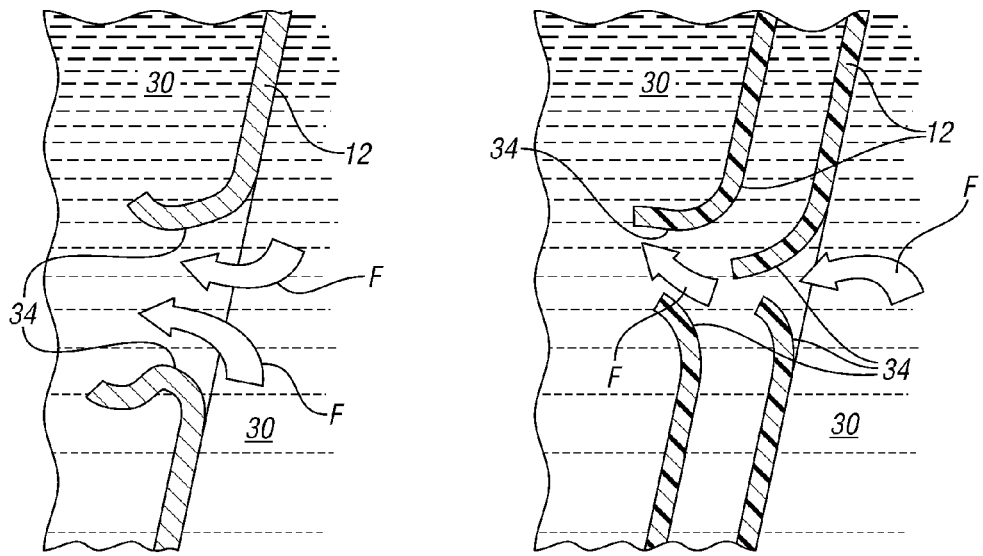
FIG. 6
(PRIOR ART)
FIG. 7
(PRIOR ART)

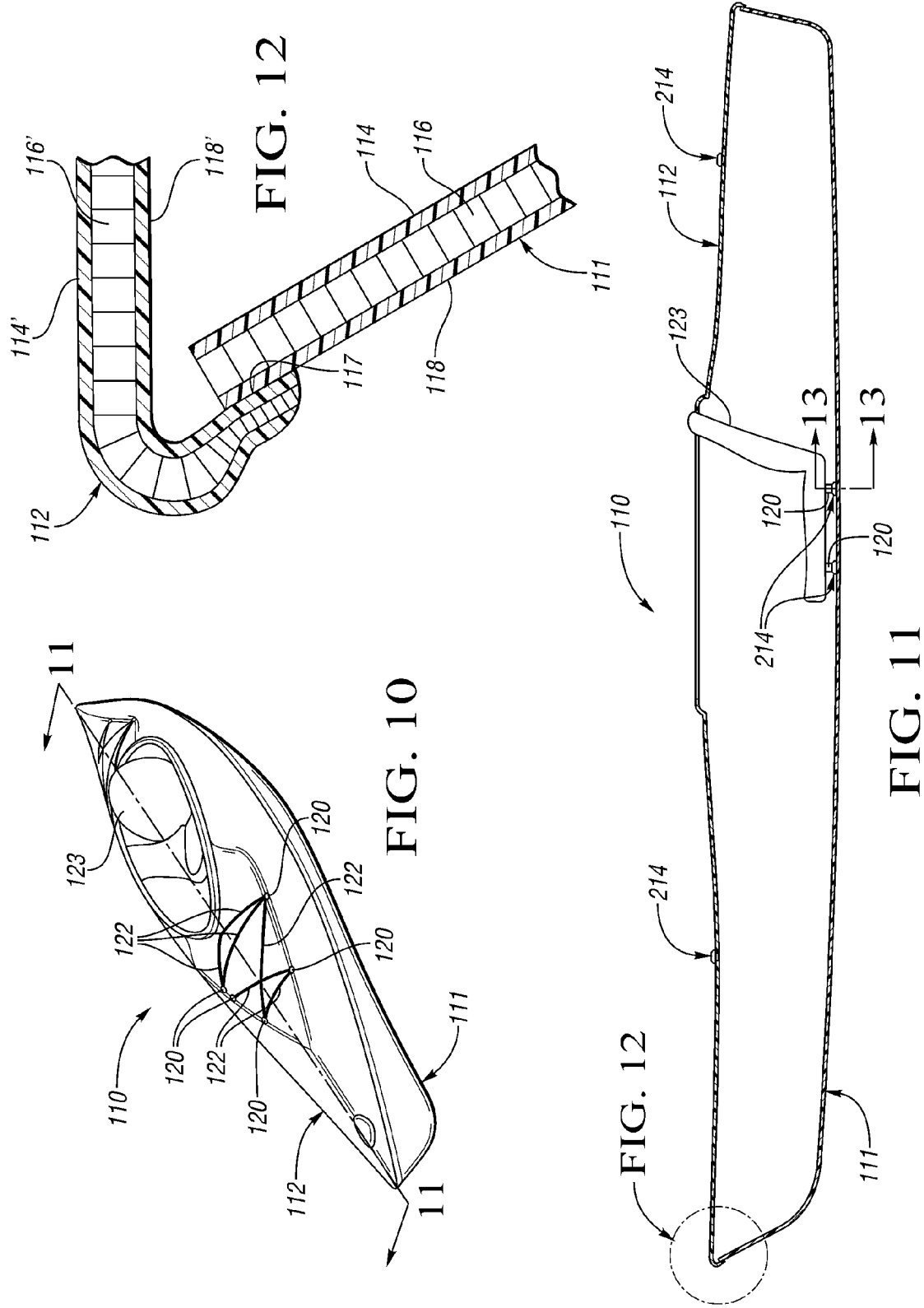

DEEP-DRAWN MARINE HULL HAVING A SANDWICH STRUCTURE WITH A CELLULOSE-BASED CORE AND WATERCRAFT UTILIZING SAME

CROSS-REFERENCE TO RELATED APPLICATION

This application is a continuation-in-part application of U.S. patent application Ser. No. 13/762,879 filed Feb. 8, 2013. That application is a continuation-in-part application of U.S. patent application entitled "Assembly Including a Compression-Molded Composite Component Having a Sandwich Structure and at Least One Fastener Component" filed May 24, 2012 and having U.S. Ser. No. 13/479,974.

TECHNICAL FIELD

This invention generally relates to stiff or hard marine hulls and, in particular, to watercraft such as kayaks which utilize such hulls and which have a sandwich structure.

OVERVIEW

Small, portable boats or watercraft come in a wide variety of models, sizes, colors and design configurations. Hulls must typically be lightweight, durable, strong and stiff. Such boats are oftentimes used for hunting, fishing and, consequently, require a large amount of storage space. Kayaks, canoes and row boats are examples and typically require room for seats.

One type of such watercraft is skin-on-frame or skin boats. These are the most commonly available portables and are made by stretching a "skin" or cover of waterproof material over a framework or skeleton. One problem with such boats is the puncture problem. A sharp rock or a pointed piece of submerged metal can create a hole or opening in the boat hull to cause the boat to sink as shown in FIGS. 1 and 2. Water 30 flows in the direction of arrows, F, through an opening 34 in a single, metal wall 12 as shown in FIG. 6. This problem can result even if the hull is double-walled 12 as shown in FIG. 7.

Another type of such watercraft have foldable hulls. U.S. Pat. No. 6,615,762 discloses a boat made of extruded corrugated plastic which is typically lightweight. The boat hull includes flat blank hull sections with fastener holes and hinge score lines. The hull sections are folded into the desired shape at the score lines which form living hinges.

One problem associated with such hulls is the large number of parts required to assemble the boat. Another problem is the faceted outline of the boat diminishes the speed and maneuverability of the boat. Also, interior flanges or ribs reduce the amount of space for one or more passengers and gear.

Another type of such watercraft are rigid or "hard shell" canoes or kayaks. They are typically made of rotomolded or thermoformed plastics, fiberglass or plywood. However, their weight makes them difficult to transport.

The following U.S. Patents are also related to the present invention: U.S. Pat. Nos. 8,316,788; 8,069,809; 7,963,243; 7,854,211, and 7,530,322.

It is highly desirable to secure hardware and other components to marine hulls and watercraft which utilize marine hulls. It is desirable to provide attachment mechanisms at various locations to secure cargo such as gear to protect the cargo from sliding, rolling, etc. which tends to damage the cargo as well as other items or structures in the cargo area.

Because of the large forces that cargo as well as individuals can exert on marine hulls, any attachment or fastening mechanism must be able to withstand not only large pull-out forces but also large push-in forces. Also, such attachment or fastening mechanisms must be able to withstand large torque forces to prevent the mechanisms from being "torqued out" of or "torqued into" the hull.

Compression molding has long been used to manufacture plastic parts or components. While widely used to manufacture thermoset plastic parts, compression molding is also used to manufacture thermoplastic parts. The raw materials for compression molding are typically placed in an open, heated mold cavity. The mold is then closed and pressure is applied to force the materials to fill up the entire cavity. A hydraulic ram or punch is often utilized to produce sufficient force during the molding process. The heat and pressure are maintained until the plastic materials are cured.

Two types of plastic compounds frequently used in compression molding are Bulk Molding Compound (BMC) and Sheet Molding Compound (SMC).

In general, compression molding provides good surface finish and can be applied to composite thermoplastics with woven fabrics, randomly oriented fiber mat or chopped strand. One of the problems associated with compression molding is that compression molding is thought to be largely limited to flat or moderately curved parts with no undercuts.

Some compression-molded composites combine a lightweight, low-density core with fiber-reinforced thermoplastic skins or outer layers thereby resulting in a sandwich structure. The resulting composite component has a high stiffness-to-weight ratio thereby making it desirable for use in a wide variety of applications including load-bearing applications. In general, the thicker the core, the higher the load-bearing capacity of the composite component.

As a result of their high stiffness-to-weight ratio and load-bearing capacity, such compression-molded composites have been used as load floors (U.S. Pat. No. 6,843,525) in automotive applications and as skis or snowboards (i.e., sliding boards) in recreational applications.

The prior art discloses a method of making a panel of sandwich-type composite structure having a cellular core in a single processing step. In that method, the panel as shown in FIG. 4 is made by subjecting a stack or blank of layers of material to cold-pressing in a compression mold. As shown in FIG. 3, the stack is made up of: at least a first skin made of a stampable reinforced thermoplastics material, a cellular core made of a thermoplastics material, and a second skin also made of a stampable reinforced thermoplastic material. The skins are typically pre-heated outside the mold to a softening temperature.

Such a method is particularly advantageous because of the fact that it makes it possible, in a single operation, to generate cohesion and bonding between the various layers of the composite component shown in FIG. 4, and to shape the resulting component while preserving all of the mechanical properties imparted by the cellular-core sandwich structure.

Panels of sandwich-type composite structure having a cellular core have rigidity characteristics sufficient to enable mechanical structures subjected to large stresses to be reinforced structurally without making them too heavy. Such panels are in common use in shipbuilding, aircraft construction, and rail vehicle construction.

The following U.S. patent documents are related to the present invention: U.S. Pat. Nos. 7,419,713; 6,890,023; 6,537,413; 6,050,630; and 2005/0189674.

Other U.S. patent documents related to the present invention include: U.S. Pat. Nos. 5,502,930; 5,915,445; 6,102, 464; 6,682,675; 6,790,026; 6,682,676; 6,825,803; 6,981,863; 7,090,274; 7,909,379; 7,919,031; 8,117,972; 2006/0255611; 2008/0185866; 2011/0315310; and 2012/0315429.

In view of the above, while the prior art shows a wide variety of marine hulls and associated construction materials and methods, a need still exists for a marine hull which is not only relatively light and low cost, but also sufficiently stiff or rigid and aerodynamically smooth, has a few number of parts yet provides a large amount of interior space for passengers and/or gear and which allows the hull or watercraft to float and not sink even when there is a hole or tear in the hull.

SUMMARY OF EXAMPLE EMBODIMENTS

An object of at least one embodiment of the present invention is to provide a deep-drawn, low cost and light weight marine hull having a sandwich structure with a cellulose-based core and watercraft utilizing same which at least partially solves at least one and preferably a plurality of problems associated with prior art marine hulls and watercraft.

In carrying out the above object and other objects of at least one embodiment of the present invention, a deep-drawn, marine hull is provided. The hull includes an outer skin of a fiber-reinforced thermoplastic material and having a waterproof outer surface, a first sheet of thermoplastic adhesive, an inner skin of fiber-reinforced thermoplastic material and having a compartment-defining outer surface, a second sheet of thermoplastic adhesive and a shock absorbing, cellular core of a cellulose-based material and positioned between the skins. The skins are bonded to the core by the first and second sheets and by press molding. The cellular core has a 2-D array of cells, each of the cells having an axis substantially perpendicular to the outer surfaces. Thickness of side walls of the hull is substantially uniform to maximize stiffness of the hull. The cells absorb energy of an impact at the outer surface of the outer skin by deformably crushing. Air trapped within cells which are not completely crushed or punctured by the impact provide the hull with buoyancy to allow the hull to float at the surface of a body of water.

The hull may form at least part of a watercraft such as a kayak.

The hull may further include at least one fastener mounted to the inner skin and capable of fastening or securing one or more objects in the compartment of the hull.

Each fastener may include a fastener part having a length and a width and a mounting part mounting the fastener part to the inner skin. The mounting part has a pair of holding faces that oppose each other and define a space therebetween. A portion of the inner skin is positioned in the space in engagement with the faces to prevent the fastener part from moving along its length relative to the inner skin.

The cellular core may be a paper honeycomb core.

The cellular core may have an open cell structure of the tubular or honeycomb cell type.

The honeycomb core may be a cardboard honeycomb core.

The cells may include triangular, cylindrical, hexagonal or square cells.

The open cells may have a diameter in a range of 2 mm to 10 mm.

The thermoplastic adhesive of the sheets may be a hot-melt adhesive.

The hull may have a thickness in a range of 5 mm to 30 mm.

At least one of the skins may be a woven skin.

Further in carrying out the above object and other objects of at least one embodiment of the present invention, a watercraft is provided. The watercraft includes a deep-drawn hull section having an outer skin of fiber-reinforced thermoplastic material and having a waterproof outer surface, a first sheet of a thermoplastic adhesive, an inner skin of a fiber-reinforced material and having a compartment-defining outer surface, a second sheet of thermoplastic adhesive and a shock absorbing, cellular core of a cellulose-based material and positioned between the skins. The skins are bonded to the core by the first and second sheets and by press molding. The cellular core has a 2-D array of cells. Each of the cells has an axis substantially perpendicular to the outer surfaces. Thickness of side walls of the hull section is substantially uniform to maximize stiffness of the hull section. The cells absorb energy of an impact at the outer surface of the outer skin by deformably crushing. Air trapped within cells which are not completely crushed or punctured by the impact provide the hull section with buoyancy to allow the watercraft to float at the surface of a body of water. The watercraft also includes a deck section bonded or joined to the hull section to form a water-resistant seal between the sections.

The watercraft may be a kayak.

The deck section may include an outer skin, an inner skin and a core of a cellulose-based material and positioned between the skins and having a large number of cavities. The skins of the deck section are adhesively bonded to the core of the deck section by press molding. The watercraft may further include at least one fastener mounted to the outer skin of the deck section and capable of fastening or securing one or more objects on the deck section.

Each fastener may include a fastener part having a length and a width and a mounting part mounting the fastener part to the outer skin of the deck section. The mounting part has a pair of holding faces that oppose each other and define a space therebetween. A portion of the outer skin is positioned in the space in engagement with the faces to prevent the fastener part from moving along its length relative to the outer skin of the deck section.

Other technical advantages will be readily apparent to one skilled in the art from the following figures, descriptions and claims. Moreover, while specific advantages have been enumerated, various embodiments may include all, some or none of the enumerated advantages.

BRIEF DESCRIPTION OF THE DRAWINGS

FIG. 5 is a view, similar to the view of FIGS. 1 and 2, showing a watercraft including a hull which has a hole formed at partially therethrough which does not cause the watercraft to sink since the watercraft is constructed in accordance with at least one embodiment of the present invention;

FIG. 6 is view, partially broken away and in cross section, taken along lines 6-6 of FIG. 1;

FIG. 7 is a view, similar to the view of FIG. 6, taken along lines 7-7 of FIG. 2;

FIG. 10 is a top perspective view of the watercraft of FIG. 5;

FIG. 11 is a sectional view of the watercraft taken along the lines 11-11 of FIG. 10;

FIG. 12 is an enlarged view, partially broken away and in cross section, taken within the phantom-line circle of FIG. 11 and showing the bonding or joining between hull and deck sections of the watercraft of FIG. 10;

DETAILED DESCRIPTION

Figure 1:
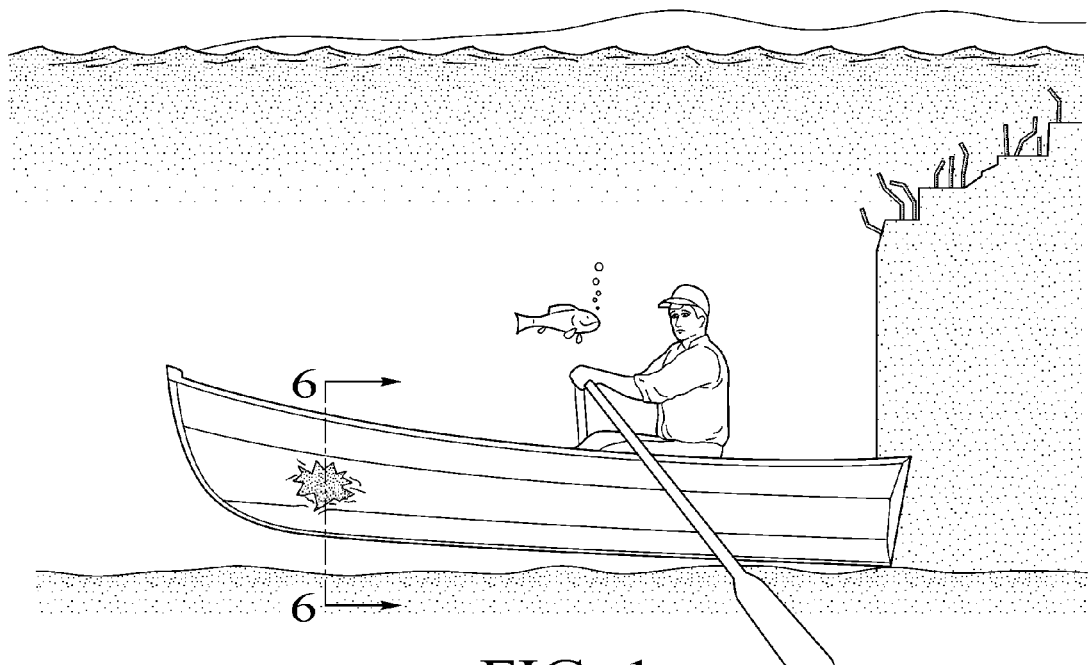
FIG. 1 is an environmental view showing a prior art watercraft including a single-wall, metal marine hull which has a hole formed therethrough to cause the watercraft to sink.
Figure 2:
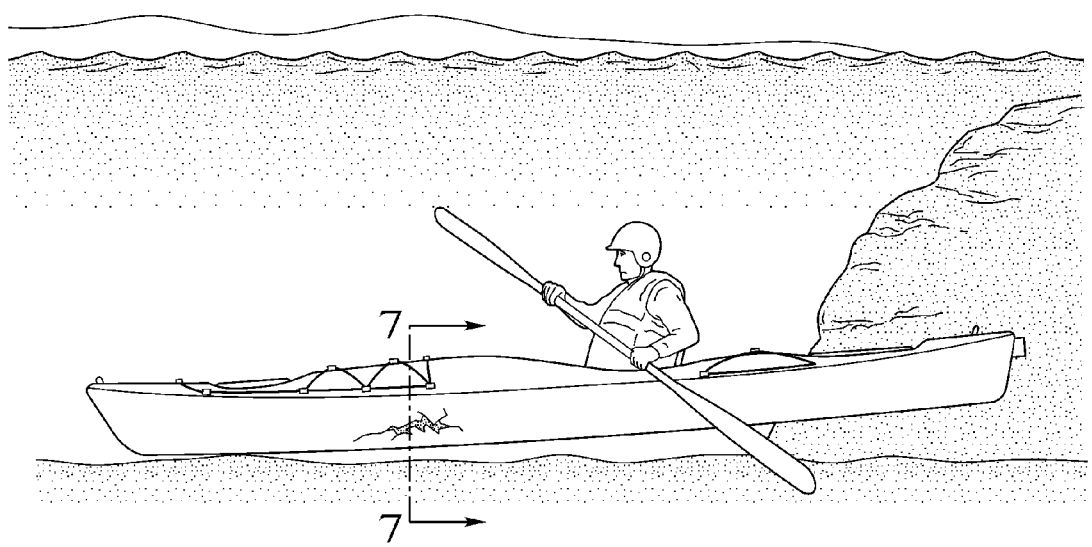
FIG. 2 is a view, similar to the view of FIG. 1, showing a different watercraft including a double-wall, plastic marine hull which has a hole formed therethrough to cause the watercraft to sink.
Figure 3:
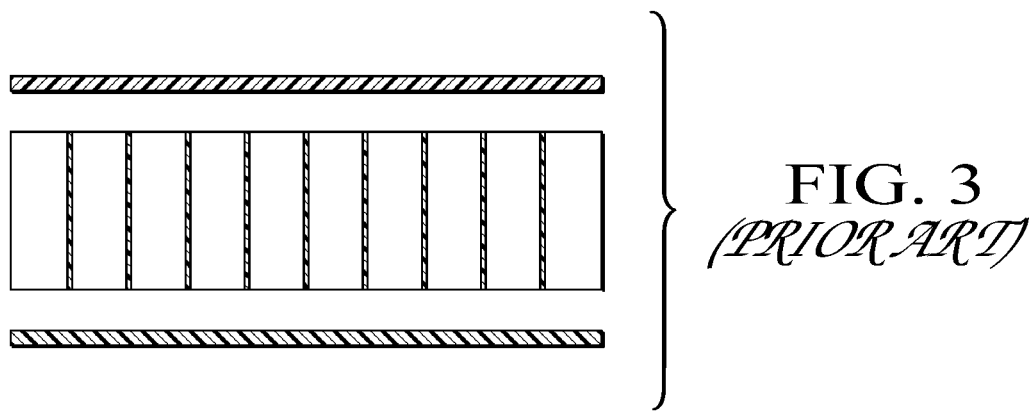
FIG. 3 is a side sectional view showing various separate layers of a prior art stack of thermoplastic-based layers of material.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Referring again to the drawing figures, FIGS. 5 and 8-12 show a kayak, generally indicated at 110, which is a form of a watercraft constructed in accordance with at least one embodiment of the present invention. The kayak 110 includes a hull section, generally indicated at 111 and a deck section, generally indicated at 112. Each of the sections 111 and 112 preferably comprises either a compression-molded or deep-drawn composite component having a sandwich structure and at least one, and, preferably, a plurality of fastener components, each of which is generally indicated at 214 in FIGS. 13-16.

Figure 8:
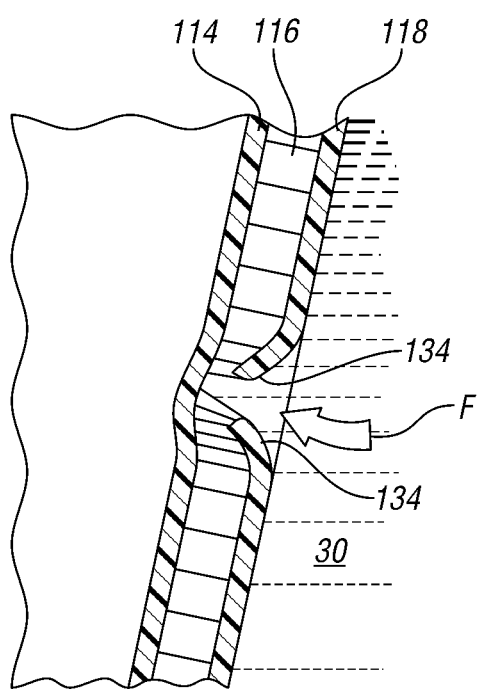
FIG. 8 is a view, partially broken away and in cross section, taken along lines 8-8 in FIG. 5 wherein water is prevented from entering the interior of the marine hull despite the hole in the marine hull.
Figure 9:
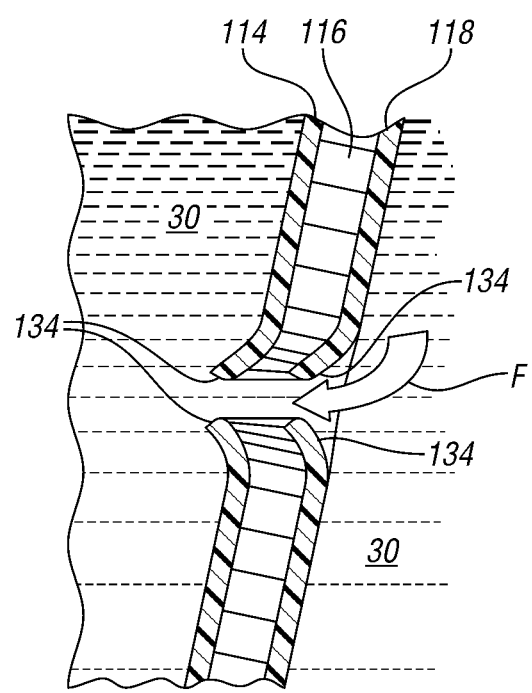
FIG. 9 is a view, similar to the view of FIG. 8, taken along lines 9-9 of FIG. 5 wherein water is not prevented from entering the interior of the marine hull but air trapped within cells of a cellular core of the marine hull prevent the watercraft from sinking despite the fact that the hole extends completely through the marine hull.

As best shown in FIGS. 8 and 9, the hull section 111 includes an outer layer or skin 118 having a waterproof outer surface, an inner layer or skin 114 having a compartment-defining outer surface and a shock absorbing cellular core 116 between the skins 114 and 118 and having a 2-D array of cells. The skins 114 and 118 are bonded to the core 116 by deep-drawing typically after pre-heating the skins 114 and 118. The skins 114 and 118 are preferably fiber-reinforced thermoplastic layers. The thermoplastic may be a polyolefin such as polypropylene. The thermoplastic may also be polyurethane. The fiber-reinforcement may be a glass mat, a natural fiber mat, a woven or non-woven mat.

Figure 4:
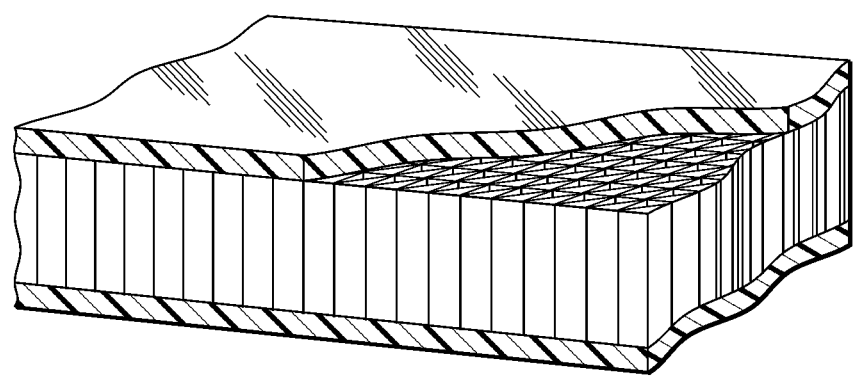
FIG. 4 is a top perspective view, partially broken away and in cross section, of the stack of FIG. 3 after low pressure, cold compression molding.

The core 116 may be a cellular core having a thermoplastic honeycomb structure as shown in FIG. 4. The core 116 may also be made of polypropylene honeycomb and aluminum honeycomb. The resulting hull section 111 typically includes a lightweight, low density core such as the core 116 together with fiber-reinforced thermoplastic skins or layers such as the skins 114 and 118.

The cells of the core 116 absorb energy of an impact at the outer skin 118 of the hull section 111 by deformably crushing as shown in FIG. 8. The number, spacing, size, shape and material of the cells are predetermined based on the anticipated types of impacts the hull section 111 may encounter.

Each cellular core 116 or 116' (i.e. FIG. 12 for the deck section 112) may be made as disclosed in the above-noted U.S. Pat. No. 7,919,031, or the prior art cited therein. The cells may have a triangular configuration or the cells may form a honeycomb including cylindrical, hexagonal, or square cells. Other shapes are also possible such as waves. The axes of the cells are perpendicular to the outer surfaces of the core 116 as well as the skins 114 and 118. Cell density (i.e. cell size and wall stock) is adjusted as needed for expected impact force. The open cells typically have a diameter in a range of 2 mm to 10 mm and the thicknesses of the cellular core with the skins 114 and 118 are typically between 5 mm and 30 mm depending on the expected impact force.

The hull section 111 is typically deep-drawn as described in U.S. Pat. No. 6,981,863 ('863 patent). As described in the '863 patent, the deep-drawing method generally includes positioning a blank of thermoplastic sandwich material having a cellular core over a female die having an article-defining cavity defined by inner surfaces of the female die. The method also includes forcing an inner portion of the blank into the female die along a substantially vertical axis and against the inner surfaces of the female die to obtain deep-drawn material. The method further includes clamping at least one outer portion of the blank immediately adjacent the female die to guide the at least one outer portion of the blank to travel into the article-defining cavity at an acute angle with respect to the vertical axis during the step of forcing so that thickness of at least one side wall of the deep-drawn material is substantially the same as thickness of the blank of thermoplastic sandwich material and so that the deep-drawn material does not significantly stretch or tear during the step of forcing. The method still further includes removing the deep-drawn material from the female die, and removing any excess material from the periphery of the deep-drawn material to form the deep-drawn hull 111.

Preferably, the step of forcing includes the step of stamping and the step of clamping is performed with a clamping force which increases during the step of forcing.

The stiffness of thermoplastic sandwich materials is due to the distance between its two skins 114 and 118 that gives a high moment of inertia to the hull section 111. It is therefore important to preserve the distance between the skins 114 and 118 during the molding of the sandwich hull section 111 in order to obtain the full stiffness potential of the hull section 111. Any reduction of thickness causes a reduction of stiffness.

During the conception of a sandwich hull section 111 with a cellular core 116, it is sometimes necessary to reduce the thickness of the hull section 111 locally in order to obtain a specific shape. The stiffness in that area will be reduced but can be maintained by the hull section geometry. An example is that of a suitcase corner that gives the stiffness to the suitcase even though the part thickness is uniform.

Hull sections made by the above-noted method are not wrinkled either on their compartment side or their water engaging side. As noted above, thickness of the side walls of the kayak 110 are relatively constant. To have a substantially consistent radius at the bottom wall of the kayak 110, the honeycomb core 116 may be partially crushed during the deep-drawing.

Referring again to FIGS. 8 and 9, cells of the core 116 absorb energy of an impact at the outer surface of the outer skin 118 by deformably crushing. Air trapped within cells which are not completely crushed or punctured by the impact provide the hull section 111 with buoyancy to allow the hull section 111 and the kayak 110 to float at the surface of a body of water 30 as shown in FIG. 5 despite the flow of water indicated by arrows, F.

Referring to FIGS. 11 and 12, the deck section 112 is bonded or joined to the hull section 111 to form a water-resistant seal 117 between the sections 111 and 112. The deck section 112 also preferably includes an outer skin 114', an inner skin 118' and a core 116' positioned between the skins 114' and 118' and having a large number of cavities. The skins 114' and 118' of the deck section 112 are bonded to the core 116' of the deck section 112 by press molding. The deck section 112 may be compression or press molded using a variety of technologies which use a low temperature, compression molding apparatus. For example, the core 116' and the skins 114' and 118' are preferably generally of the type shown in U.S. patent documents U.S. Pat. Nos. 6,537,413; 6,050,630; and 2005/0189674.

Figure 13:
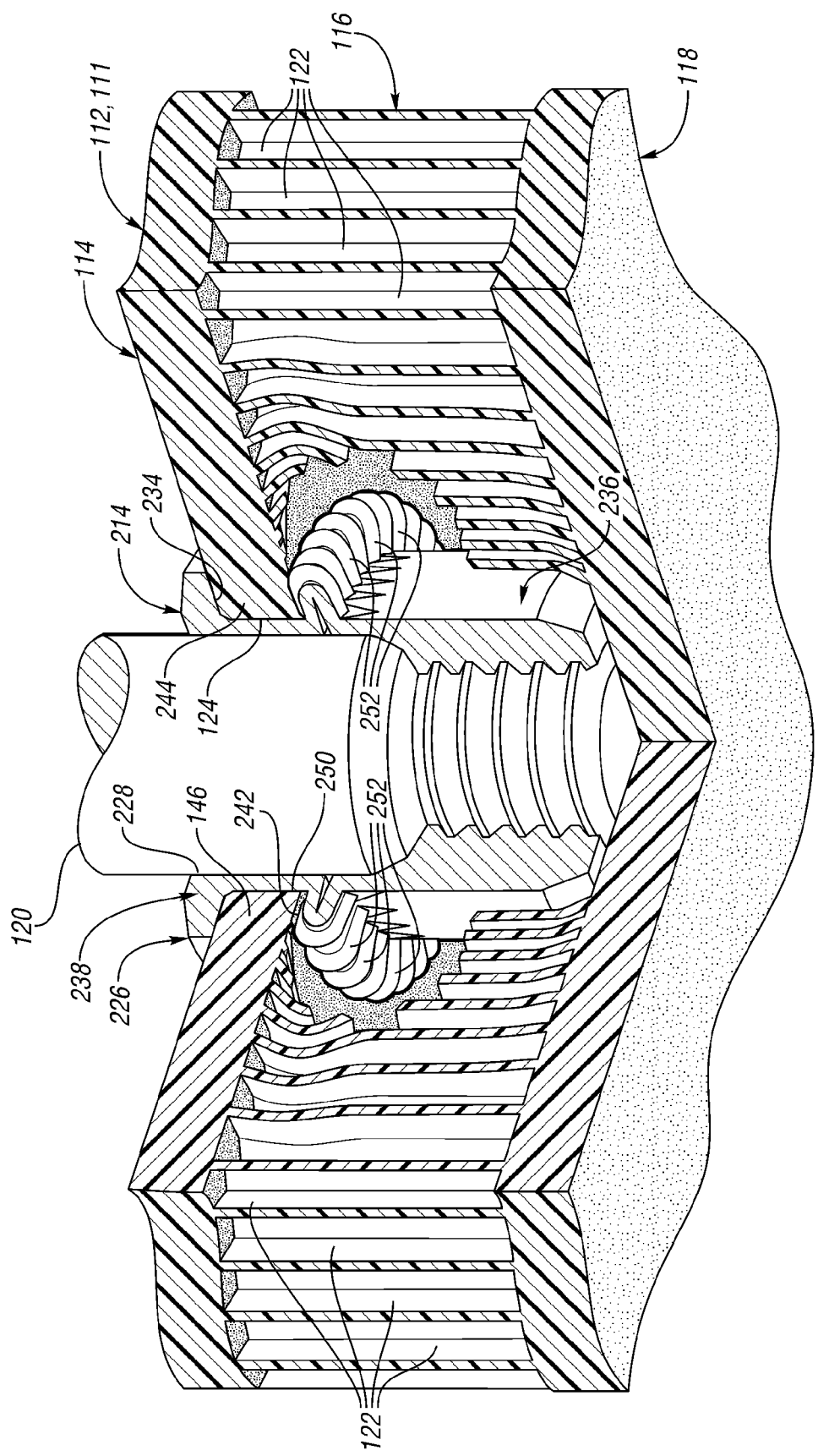
FIG. 13 is a view, partially broken away and in cross section, taken along lines 13-13 of FIG. 11 and showing a fastener component mounted in a hole formed through an outer layer or skin of the marine hull.

Referring to FIG. 13, after deep-drawing of the hull section 111 (or after compression molding of the deck section 112) at least one hole and, preferably, a plurality of holes 124 are formed in the section 111 (or 112) such as by cutting through the inner skin 114, through the core 116 and right up to but not through the outer skin 118. A rivot-like fastener such as the fastener component 214 is positioned in each of the holes 124. Each of the fastener components 214 is generally of the type shown in U.S. patent publications U.S. Pat. No. 7,713,011 and 2007/0258786 wherein the preferred fastener component is called an M4 insert, installed by use of a hydro-pneumatic tool both of which are available from Sherex Fastening Solutions LLC of New York.

Figure 14:
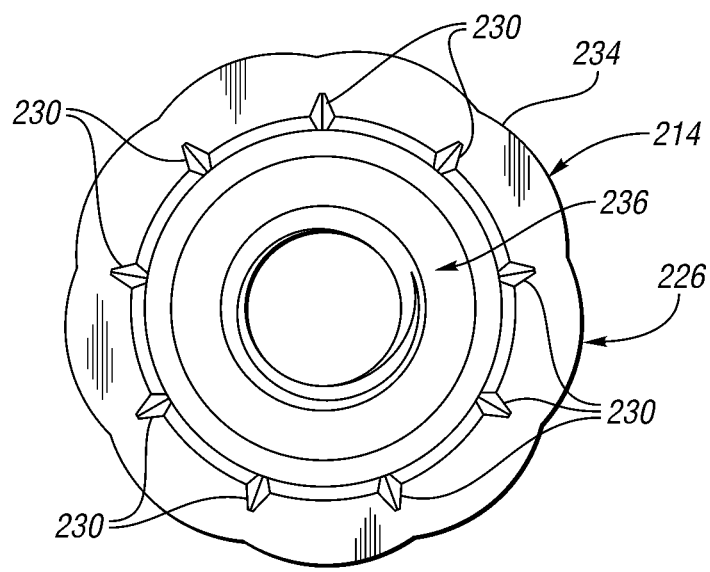
FIG. 14 is an end view of the fastener component of FIG. 13 prior to insertion in the marine hull.
Figure 15:
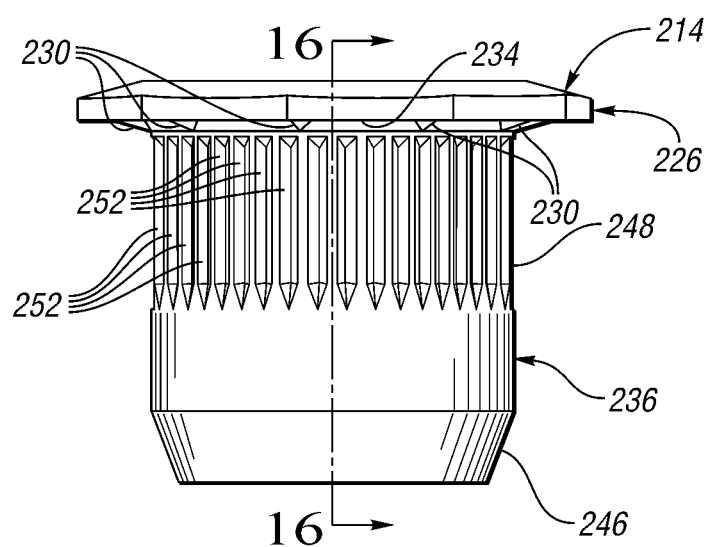
FIG. 15 is a side elevational view of the fastener component prior to insertion.
Figure 16:
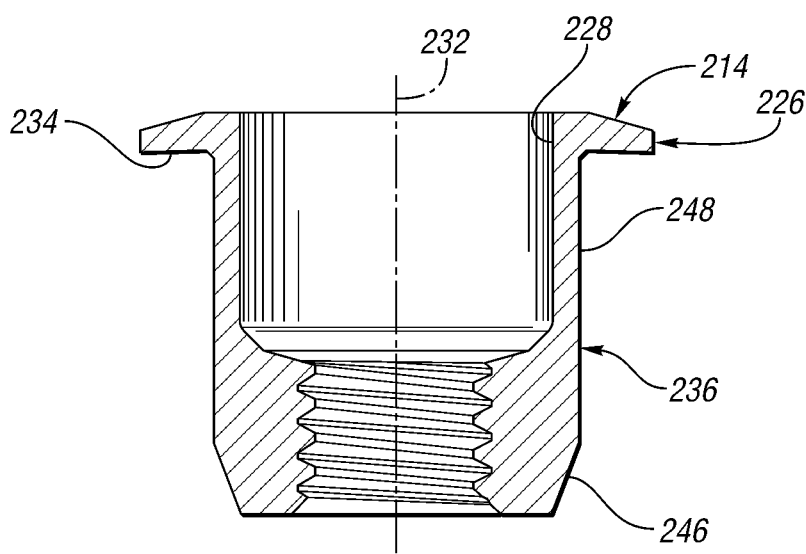
FIG. 16 is a sectional view of the fastener component taken along lines 16-16 of FIG. 15.

One of the fastener components 214 is illustrated in FIGS. 14-16 prior to installation wherein during installation an outer sleeve of the fastener component 214 is deformed, the deformed component 214 being shown in FIG. 13. The fastener component 214 typically has a relatively large annular flange, generally indicated at 226, an open end 228 and a plurality of integrally formed locking formations or wedges 230 circumferentially spaced about an axis 232 of the component 214 on an annular face 234 of the flange 226 to prevent rotary motion of the fastener component 214 relative to the inner skins 114 after installation. The wedges 230 grip into the outer surface of the inner skins 114 after the fastener component 214 is attached to the inner skin 114.

In general, each fastener component 214 includes a cylindrical fastener portion or part, generally included at 236, having a length and width, and a mounting portion or part, generally indicated at 238, for mounting the fastener part 236 to the inner skin 114. The mounting part 238 includes the annular holding face 234 and an annular holding face 242 that oppose each other and define an annular space 244 therebetween. An annular portion 146 of the inner skin 114 is positioned in the space 244 in engagement with the faces 234 and 242 to prevent the fastener part 236 from moving along its length or axis 232 relative to the inner skin 114. The axis 232 is generally central to the fastener part 236 and the annular holding faces 234 and 242 are oriented to face axially along the axis 232.

The fastener part 236 is threaded such as being internally threaded. By being internally threaded, an externally threaded part of the above-noted tool is threadedly secured to the fastener part 236 and then rotated to move a distal end 246 of the fastener part 236 towards the open end 228 of the part 236 thereby deforming an outer tubular sleeve 248 of the fastener part 236 to form a second annular flange 250 having the holding face 242. Preferably, the outer surface of the sleeve 248 includes a plurality of circumferentially spaced knurls 252 which form locking formations on the holding face 242 of the annular flange 250 to further prevent rotary motion of the fastener component 224 relative to the inner skin 114.

In like fashion, after compression or press molding the deck section 112 holes similar to the holes 124 are formed in the deck section 112. Also, in like fashion, rivot-like fasteners such as the fastener component 214 are positioned in each of the holes in the outer skin 114' and the core 116' of the deck section 112.

As shown in FIGS. 5, 10 and 11, the rivot-like fasteners 214 mounted to the outer skin 114' of the deck section 112 are capable of fastening or securing one or more objects on the deck section 112 by means of straps or leashes 122 and externally threaded anchors such as screws or bolts 120. Such objects may include a paddle 13, a helmet 15 or a PFD 17 for a paddler 20 who may have encountered an underwater obstruction 32 (i.e., FIG. 5) which caused a hole in the hull section 111 of the kayak 110.

As shown in FIG. 11, the rivot-like fasteners 214 mounted to the inner skin 114 of the hull section 111 are capable of fastening or securing one or more objects in the inner compartment of the kayak 110 via externally threaded anchors such as bolts or screws 120. Such objects may include safety equipment and/or gear such as hunting or fishing gear, as well as one or more seats 123 and/or padding, foot braces, etc.

Other types of fasteners may be used to removably secure one or more objects to the sections 111 and 112 of the kayak 110 such as snap fasteners or Velcro fasteners.

Figure 17:
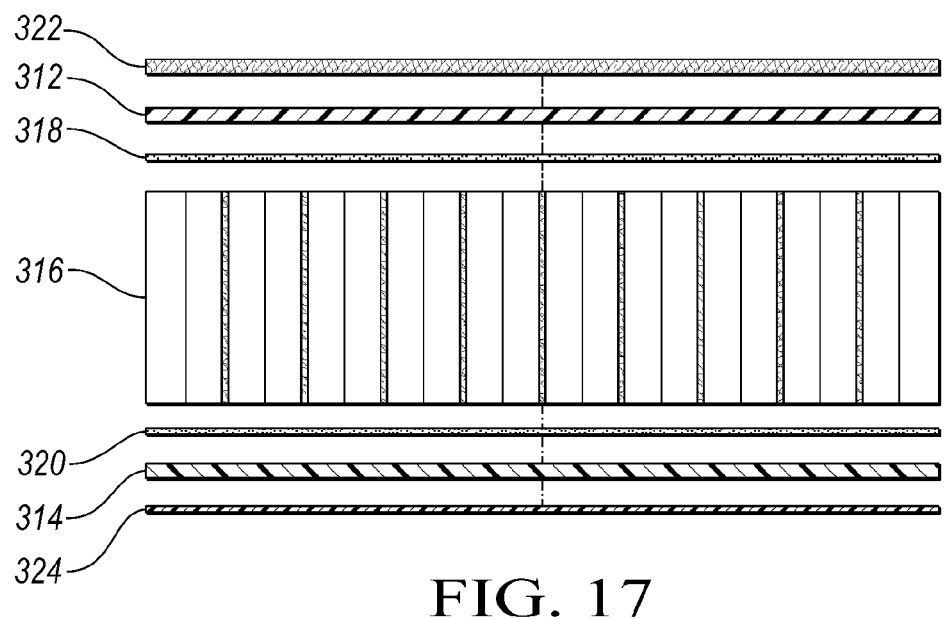
FIG. 17 is a side sectional view showing a stack of various separate sheets or layers of thermoplastic and cellulose-based material prior to being compression molded into a marine hull having a sandwich structure.
Figure 18:
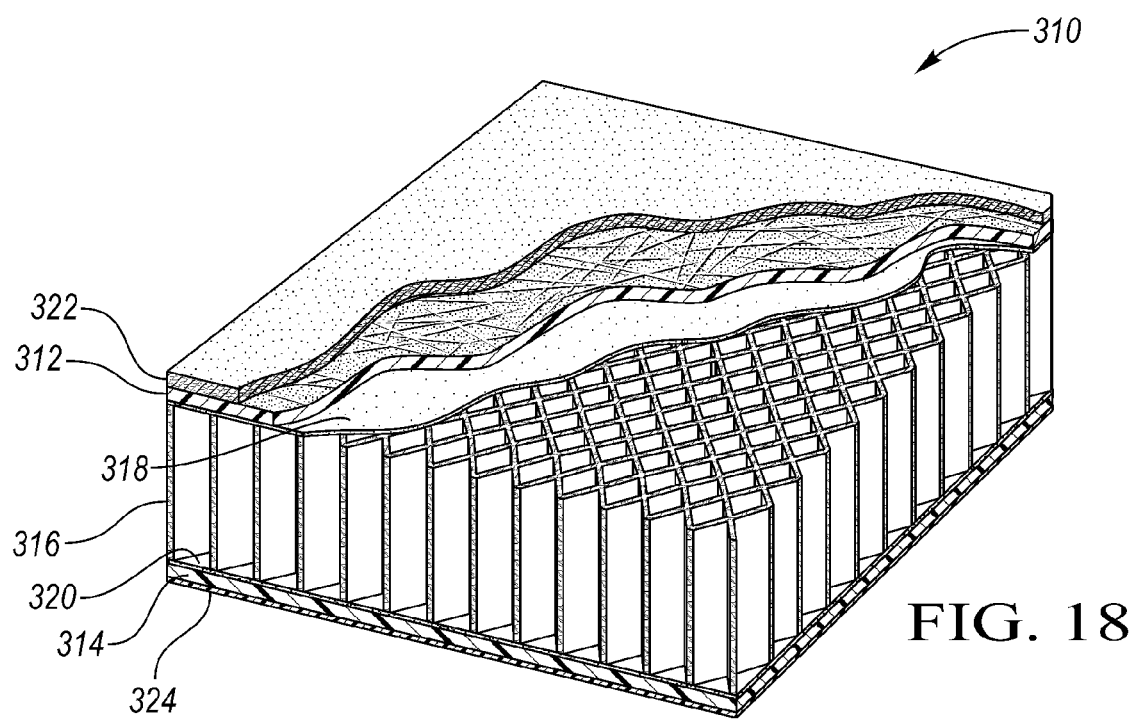
FIG. 18 is a top perspective view, partially broken away and in cross section, of the hull of FIG. 17.
Figure 19:
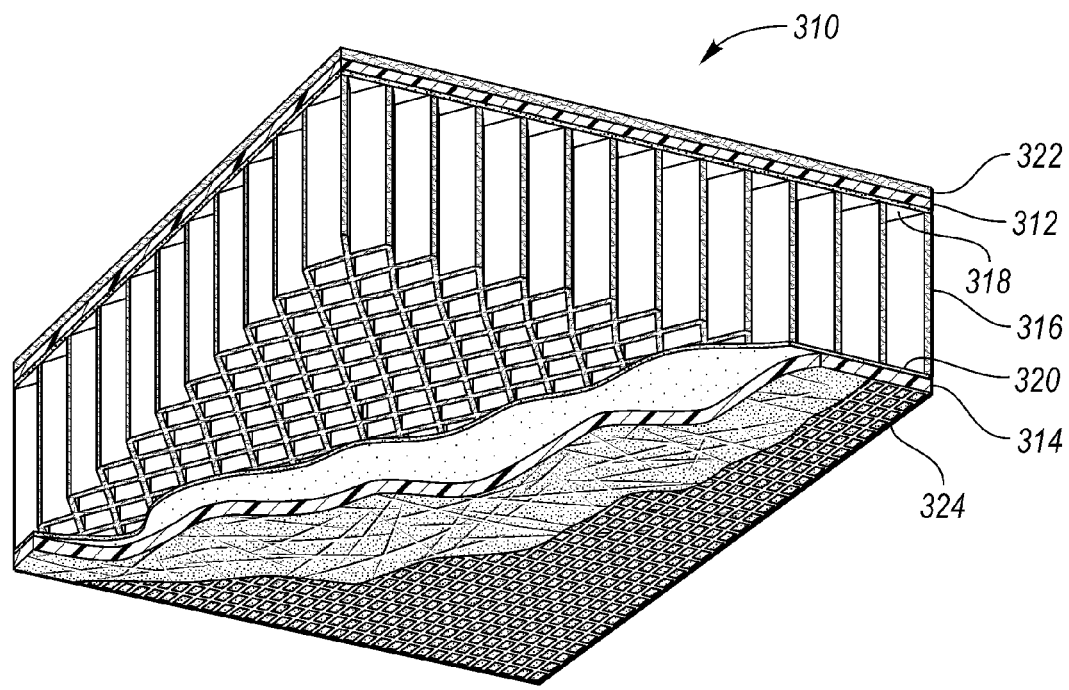
FIG. 19 is a view similar to the view of FIG. 18 but providing a bottom perspective view.

Referring now to the FIGS. 18 and 19, a portion of another embodiment of a compression-molded, sandwich-type, composite marine hull or deck section, generally indicated at 310, is shown. FIG. 17 shows a stack of thermoplastic-based and cellulose-based sheets or layers of material prior to the stack being compression molded into the composite hull or section 310. The hull 310 may have a fastener component (not shown in FIGS. 18 and 19 but shown at reference numeral 214 in FIGS. 11 and 13-16).

The panel 310 is typically manufactured via a thermo compression process by providing the stack of material located or positioned within a low pressure, thermo-compression mold. As shown in FIG. 17, the stack includes first and second reinforced thermoplastic skins or outer layers 312 and 314, respectively, a cellulose-based core having a large number of cavities such as a paper or cardboard cellular core 316 disposed between and bonded to plys or films or sheets of hot-melt adhesive (i.e. thermoplastic adhesive) 318 and 320 which, in turn, are disposed between and bonded to the skins 312 and 314 by the press or compression molding. The sheets 318 and 320 may be bonded to their respective skins 312 and 314 prior to the press molding or are preferably bonded during the press molding. The thermoplastic of the sheets 318 and 320 is typically compatible with the thermoplastic of the skins 312 and 314 so that a strong bond is formed therebetween. One or more other resins may also be included within the adhesive of the sheets 318 and 320 to optimize the resulting adhesive system. The adhesive system is not a solvent-based adhesive system.

An optional substantially continuous covering or carpet layer, generally indicated at 322, made of thermoplastics material covers the first skin 312. The skins 312 and 314 and their respective sheets or film layers 318 and 320 (with the core 316 in between the layers 318 and 320) are heated typically outside of the mold (i.e. in an oven) to a softening temperature wherein the hot-melt adhesive becomes sticky or tacky. The mold is preferably a low-pressure, compression mold which performs a thermo-compression process on the stack of materials.

Figure 20:
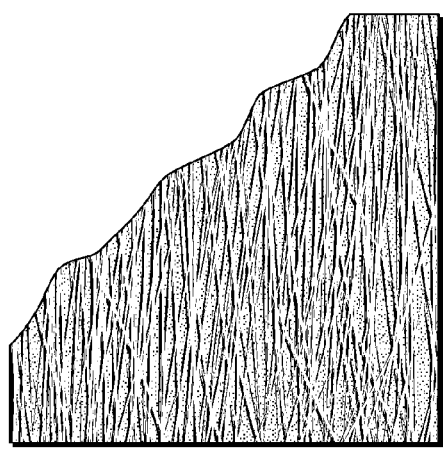
FIG. 20 is a top plan view, partially broken away, of a reinforced thermoplastic skin having substantially parallel, visible fibers.
Figure 21:
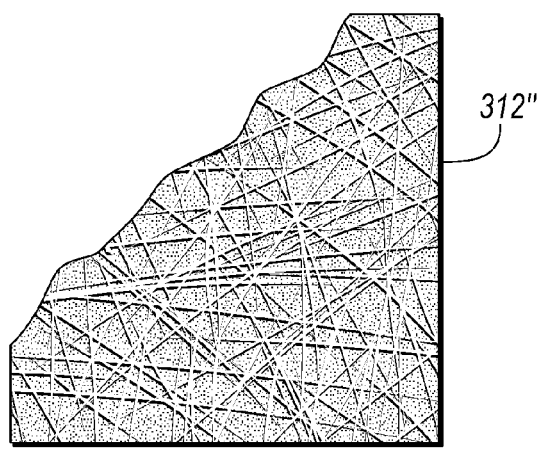
FIG. 21 is a view similar to the view of FIG. 20 but with substantially randomly oriented, visible fibers.

The step of applying the pressure compacts and reduces the thickness of the cellular core 316 and top and bottom surface portions of the cellular core 316 penetrate and extend into the film layers 318 and 320 without penetrating into and possibly encountering any fibers located at the outer surfaces of the skins 312 and 314 thereby weakening the resulting bond. Often times the fibers in the skins 312 and 314 are located on or at the surfaces of the skins as shown by skins 312' or 312" in FIGS. 20 and 21, respectively, wherein the fibers are substantially parallel and randomly oriented, respectively.

The carpet layer 322 may be a resin carpet and the resin may be polypropylene. The carpet layer 322 may be made of a woven or nonwoven material (typically of the carpet type).

An optional bottom layer of the hull 310 comprises a decorative, covering layer 324 bonded to the bottom surface of the hull 310 to provide an aesthetically pleasing appearance to the bottom of the hull 310.

The cellulose-based, cellular core 316 may be a honeycomb core. In this example, the cellular core has an open-celled structure of the type made up of a tubular honeycomb, and it is made mainly of cellulose and preferably of paper or cardboard. The sticky or tacky hot-melt adhesive extends a small amount into the open cells during the thermo-compression process. It is also possible to use a cellular structure having closed cells, a material, such as a wooden part, to which the top and bottom film layers 318 and 320, respectively, are adhesively bonded.

Each of the skins 312 and 314 may be fiber reinforced. The thermoplastic of the sheet or film layers 318 and 320, the skins 312 and 314, and the covering layers 322 and 324 may be polypropylene. Alternatively, the thermoplastic may be polycarbonate, polyimide, acrylonitrile-butadiene-styrene as well as polyethylene, polyethylene terphthalate, polybutylene terphthalate, thermoplastic polyurethanes, polyacetal, polyphenyl sulphide, cyclo-olefin copolymers, thermotropic polyesters and blends thereof. At least one of the skins 312 and 314 may be woven skin, such as polypropylene skin. Each of the skins 312 and 314 may be reinforced with fibers, e.g., glass fibers, carbon fibers, aramid and/or natural fibers. At least one of the skins 312 and 314 can advantageously be made up of woven glass fiber fabric and of a thermoplastics material.

The resulting hull or deck section 310 may have a thickness in the range of 5 to 25 mm.

In one example method of making the hull or deck section 310, a stack of material may be pressed in a low pressure, cold-forming mold (not shown). The stack is made up of the first skin 312, the first film layer 318, the paper cellular core 316, the second film layer 320, the second skin 314 and the covering layers 322 and 324, and is pressed at a pressure lying in the range of $10 \times 10^5$ Pa. to $30 \times 10^5$ Pa. The first and second skins 312 and 314, and the first and second film layers 318 and 320 are preferably pre-heated to make them malleable and stretchable. Advantageously, in order to soften the first and second skins 312 and 314, and their respective film layers 318 and 320, respectively, heat is applied to a pre-assembly made up of at least the first skin 312, the first film layer 318, the paper cellular core 316, the second skin 314 and the second film layer 320 so that, while the hull 310 is being formed in the mold, the first and second skins 312 and 314 and the film layers 318 and 320 have a forming temperature lying approximately in the range of 160° C. to 200° C., and, in this example, about 180° C.

The covering layer 322 is substantially continuous and may be formed from separate pieces of thermoplastic resin carpet which are subsequently bonded or fused together, such as by heat and/or pressure to carpet the entire top surface of the hull 310.

The bottom layer 324 of the hull or deck section 310 may be made of a nonwoven scrim 324 of fine denier, spunbond thermoplastic (i.e., polypropylene and/or polyester or other thermoplastic compatible to the process) fibers in the form of a sheet and having a weight in a range of 8 to 100 gsm (i.e., grams per square meter). Preferably, the weight is in a range of 17 to 60 gms. Also, preferably, the denier is in a range of 1.8 to 2.2.

The scrim 324 has an open mesh of nonwoven synthetic thermoplastic fibers including a plurality of adjacent openings. The scrim 324 both transmits light to the underlying layer and reflects light. The scrim 324 may be manufactured in a color which is substantially the same, complements or is in contrast with the color of the upper carpet 322. Also, the hull or deck section 310 including the underlying scrim layer 324 and the carpet 322 can be made in a single compression molding step.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A deep-drawn, marine hull comprising:
   an outer skin of fiber-reinforced thermoplastic material and having a waterproof outer surface;
   a first sheet of thermoplastic adhesive;

an inner skin of fiber-reinforced thermoplastic material and having a compartment-defining outer surface; and
a second sheet of thermoplastic adhesive;
a shock absorbing, cellular core of a cellulose-based material and positioned between the skins wherein the skins are bonded to the core by the first and second sheets and by press molding, wherein the cellular core has a 2-D array of cells, each of the cells having an axis substantially perpendicular to the outer surfaces, wherein thickness of side walls of the hull is substantially uniform to maximize stiffness of the hull, the cells absorbing energy of an impact at the outer surface of the outer skin by deformably crushing, wherein air trapped within cells which are not completely crushed or punctured by the impact provide the hull with buoyancy to allow the hull to float at the surface of a body of water.

2. The hull as claimed in claim 1, wherein the hull forms at least part of a watercraft.

3. The hull as claimed in claim 2, wherein the watercraft is a kayak.

4. The hull as claimed in claim 1, further comprising at least one fastener mounted to the inner skin and capable of fastening or securing one or more objects in the compartment of the hull.

5. The hull as claimed in claim 4, wherein each fastener includes a fastener part having a length and a width and a mounting part mounting the fastener part to the inner skin, the mounting part having a pair of holding faces that oppose each other and define a space therebetween, a portion of the inner skin being positioned in the space in engagement with the faces to prevent the fastener part from moving along its length relative to the inner skin.

6. The hull as claimed in claim 1, wherein the cellular core is a paper honeycomb core.

7. The hull as claimed in claim 1, wherein the cellular core has an open cell structure of the tubular or honeycomb cell type.

8. The hull as claimed in claim 7, wherein the open cells have a diameter in a range of 2 mm to 10 mm.

9. The hull as claimed in claim 1, wherein the thermoplastic adhesive of the sheets is a hot-melt adhesive.

10. The hull as claimed in claim 1, wherein the hull has a thickness in a range of 5 mm to 30 mm.

11. The hull as claimed in claim 1, wherein the core is a paper core.

12. The hull as claimed in claim 1, wherein the core is a cardboard core.

13. The hull as claimed in claim 1, wherein at least one of the skins is a woven skin.

14. A watercraft comprising:
a deep-drawn hull section including:
an outer skin of fiber-reinforced thermoplastic material and having a waterproof outer surface;
a first sheet of a thermoplastic adhesive;
an inner skin of a fiber-reinforced material and having a compartment-defining outer surface;
a second sheet of thermoplastic adhesive; and
a shock absorbing, cellular core of a cellulose-based material and positioned between the skins, wherein the skins are bonded to the core by the first and second sheets and by press molding, wherein the cellular core has a 2-D array of cells, each of the cells having an axis substantially perpendicular to the outer surfaces, wherein thickness of side walls of the hull section is substantially uniform to maximize stiffness of the hull section, the cells absorbing energy of an impact at the outer surface of the outer skin by deformably crushing, wherein air trapped within cells which are not completely crushed or punctured by the impact provide the hull section with buoyancy to allow the watercraft to float at the surface of a body of water; and
a deck section bonded or joined to the hull section to form a water-resistant seal between the sections.

15. The watercraft as claimed in claim 14, wherein the watercraft is a kayak.

16. The watercraft as claimed in claim 15, wherein the deck section includes an outer skin, an inner skin and a core of a cellulose-based material and positioned between the skins and having a large number of cavities wherein the skins of the deck section are bonded to the core of the deck section by press molding.

17. The watercraft as claimed in claim 14, further comprising at least one fastener mounted to the outer skin of the deck section and capable of fastening or securing one or more objects on the deck section.

18. The watercraft as claimed in claim 17, wherein each fastener includes a fastener part having a length and a width and a mounting part mounting the fastener part to the outer skin of the deck section; the mounting part having a pair of holding faces that oppose each other and define a space therebetween, a portion of the outer skin being positioned in the space in engagement with the faces to prevent the fastener part from moving along its length relative to the outer skin of the deck section.

\* \* \* \* \*